United States Patent [19]

Aketa et al.

[11] Patent Number: 5,514,739

[45] Date of Patent: May 7, 1996

[54] MOLDING COMPOSITION AND MOLDED PRODUCT UTILIZING A SPECIFICALLY DEFINED POLYMERIC BLEND AND PHOSPHORUS COMPOUND

[75] Inventors: Tomoyuki Aketa; Takayuki Ishikawa, both of Shizuoka, Japan

[73] Assignee: Polyplastics Co., Ltd., Osaka, Japan

[21] Appl. No.: 338,228

[22] Filed: Nov. 9, 1994

[30] Foreign Application Priority Data

Nov. 11, 1993 [JP] Japan .................... 5-282377
Oct. 14, 1994 [JP] Japan .................... 6-249116

[51] Int. Cl.⁶ .................... C08K 5/524; C08L 67/03; C08L 67/02; C08L 69/00
[52] U.S. Cl. .................... 524/108; 524/128; 524/135; 524/147; 525/425; 525/433; 525/439; 525/444
[58] Field of Search .................... 525/425, 433, 525/439, 444; 524/108, 128, 135, 147

[56] References Cited

U.S. PATENT DOCUMENTS

| | | | |
|---|---|---|---|
| 2,437,046 | 3/1948 | Rothrock | 524/147 |
| 3,305,520 | 2/1967 | Fritz | 524/147 |
| 4,276,397 | 6/1981 | Froix | 525/448 |
| 4,408,022 | 10/1983 | Cincotta et al. | 525/444 |
| 4,433,083 | 2/1984 | Cogswell et al. | 524/27 |
| 4,438,236 | 3/1984 | Cogswell et al. | 525/165 |
| 4,451,611 | 5/1984 | Cincotta et al. | 525/51 |
| 4,460,735 | 7/1984 | Froix | 524/537 |
| 4,460,736 | 7/1984 | Froix | 524/539 |
| 4,489,190 | 12/1984 | Froix | 524/539 |
| 4,639,504 | 1/1987 | Cottis | 528/176 |
| 4,728,698 | 3/1988 | Isayev | 525/425 |
| 4,778,858 | 10/1988 | Ginnings | 525/425 |
| 4,952,663 | 8/1990 | Cleary et al. | 528/193 |
| 5,225,488 | 7/1993 | Baird | 525/425 |

FOREIGN PATENT DOCUMENTS

| | | | |
|---|---|---|---|
| 0180960 | 5/1986 | European Pat. Off. | |
| 411866 | 2/1991 | European Pat. Off. | 524/147 |

*Primary Examiner*—David Buttner
*Attorney, Agent, or Firm*—Burns, Doane, Swecker & Mathis

[57] ABSTRACT

An improved synthetic resin composition is provided that consists essentially of 100 parts by weight of a resin component composed of 50 to 99 (preferably 50 to 90) parts by weight of a melt-processable polyester that does not form an anisotropic melt phase and 1 to 50 (preferably 10 to 50) parts by weight of a liquid crystal polyester that is capable of forming an anisotropic melt phase, to which has been added 0.01 to 0.5 part by weight of a phosphorus compound. The presence of the phosphorus compound has been found to facilitate the fibrillation of the liquid crystal polyester component during molding so as to form fibrils within the resulting molded article having an aspect ratio of 6 or more. The resulting molded article accordingly exhibits significantly enhanced mechanical properties.

15 Claims, No Drawings

5,514,739

MOLDING COMPOSITION AND MOLDED PRODUCT UTILIZING A SPECIFICALLY DEFINED POLYMERIC BLEND AND PHOSPHORUS COMPOUND

FIELD OF THE INVENTION

The invention relates to a blended resin composition comprising a polyester resin that does not form an anisotropic melt phase and a liquid crystal polyester resin, as well as a molded product formed thereof.

BACKGROUND OF THE INVENTION

A liquid crystal polyester resin (LCP) capable of forming an anisotropic melt phase is a thermoplastic resin having many desirable characteristics such as high strength, high rigidity, high thermal resistance, and easy moldability, but there are also commercial disadvantages such that the mold shrinkage and mechanical properties tend to vary depending upon the molecular chain orientation and the direction in which the measurement is conducted, and the purchase price tends to be high.

On one hand, a polyester resin such as a polycarbonate resin (PC), etc. that does not form an anisotropic melt phase is relatively cheap, but the physical properties thereof such as rigidity are inferior to that of a liquid crystal polyester. More specifically, the rigidity is insufficient for use in the formation of a thin housing, so that thickening is necessary when designing a part constructed therefrom. There are thus some limitations for applications intended to carry out the miniaturizing and weight-reducing trends that are operative in the electric, electronic, and communication equipment fields.

Thus, in order to make a good use of the advantageous properties of the LCP and the polyester resin not forming an anisotropic melt phase, it has been tried to mix them in an effort to compensate for the disadvantages of each. However, in an injection molded product made from a resin composition wherein a small quantity of an LCP is blended with a polyester resin that does not form an anisotropic melt phase, the characteristics of LCP, such as high strength, high rigidity, high thermal resistance and easy moldability are not put to a good use and the mechanical strength of the resulting blend decreases markedly. The cause thereof is that the high mechanical properties of LCP are only produced when there is molecular orientation created by shear stress and tensile stress during molding. That is, in a resin composition obtained by only blending a polyester resin not forming an anisotropic melt phase and a small quantity of LCP, although molecules are orientated in areas near the surface layer of the product, areas other than the surface layer have a morphology wherein the polyester resin that does not form an anisotropic melt phase serves as a matrix and almost all LCP is dispersed somewhat spherically without any reinforcing effect. Only after the LCP is fibrillated within a product during molding, is the LCP molecularly orientated in the direction of the product length in a fibrous configuration having a reinforcing effect.

On the other hand, if the proportion of LCP is increased and the polyester resin not forming an anisotropic melt phase is decreased, there is produced a morphology wherein the LCP is a matrix and the PC is dispersed as islands therein. As a result, the advantageous properties of the polyester resin not forming an anisotropic melt phase cannot be put to good use and its usefulness in the blend is lessened.

Thus, there have been considered some methods by which a thermoplastic resin, such as LCP and PC, are extruded with drawing at a temperature that melts both resins, to form a molding composition wherein the LCP is present in a fibrous form having a large aspect ratio. The resulting molding composition is then molded at a temperature at which LCP is not molten and only the other thermoplastic resin, such as the PC, is molten, to form a molded product containing fibrous LCP which exhibits a reinforcing effect, as described in the Specifications of Japanese Patent Open-laid Application Nos. Hei 5-70700 and Hei 5-112709.

However, the LCP should be kept in its orientated state in fibrous form by preliminarily extruding and drawing the same, or alternatively, the resin composition should be subjected to high shear conditions when placed in the mold that are designed to fibrillate the LCP.

In the former case, the flowability is poor and the possibility for molding is limited. In the latter case, the appearance of the product may suffer and also insufficient strength may result because of insufficient fibrillation.

SUMMARY OF THE INVENTION

The present inventors have studied and investigated zealously in order to obtain a composition having excellent characteristics for molding applications while taking into consideration the above-mentioned problems, and have formed an improved synthetic resin molding composition by the introduction of a phosphorous compound in accordance with the concept of the present invention. It is now unnecessary to extrude the LCP beforehand to produce molecular orientation in a fibrous form. In accordance with the concept of the present invention the LCP serves a reinforcing effect while molding at a temperature at which the LCP flows sufficiently during the molding step to fibrillate the LCP easily. One obtains in the product values close to those of the LCP in the areas of mechanical strength and thermal resistance as well as ease of moldability.

The present invention provides an improved synthetic composition comprising 100 parts by weight of a resin component composed of 50 to 99 (e.g., 50 to 90) parts by weight of a polyester resin (a) that does not form an anisotropic melt phase, and 1 to 50 (e.g., 10 to 50) parts by weight of a liquid crystal polyester resin (b) that is capable of forming an anisotropic melt phase, as well as 0.01 to 0.5 (e.g., 0.05 to 0.3) part by weight of a phosphorus compound (c), wherein the liquid crystal polyester resin (b) that is capable of forming an anisotropic melt phase readily undergoes fibrillation to assume an aspect ratio of 6 or more (i.e., at least 6) during the molding of such composition.

In a preferred embodiment of the present invention the improved synthetic resin composition comprises 100 parts by weight of a resin component composed of 50 to 90 parts by weight of a polycarbonate resin (a) that does not form an anisotropic melt phase, and 10 to 50 parts by weight of a liquid crystal polyester resin (b) that does form an anisotropic melt phase, and 0.05 to 0.5 part by weight of a phosphorus compound (c), wherein (b) is capable of readily undergoing fibrillation to assume an aspect ratio of 6 or larger (i.e., at least 6) during the molding of such composition.

A process for producing a molded article from the above-defined composition comprising components (a), (b) and (c), is provided wherein component (b) is fibrillated to an aspect ratio of 6 or more (i.e., at least 6) during the molding of molten components (a) and (b) containing (c) dispersed therein.

DETAILED DESCRIPTION

The nature of the present invention is set forth in greater detail hereafter.

The liquid crystal polyester resin (b) which is capable of forming an anisotropic melt phase is a melt-processable polyester and possesses molecular chains that inherently assume a regular parallel ordered disposition in the molten state. The state wherein the molecules are so ordered is often referred to as the liquid crystal state or the nematic phase of a liquid crystal material. Such polymer molecules are generally slender and flat, and have high rigidity along the axes of the molecules and commonly comprise polymer chains with multiple chain-extending bonds that generally are present in either co-axial or parallel relationships.

The presence of an anisotropic melt phase can be confirmed by a polarization test method. More specifically, confirmation of the anisotropic melt phase can be carded out by using a Leitz polarization microscope and observing a molten sample mounted on a Leitz hot stage under a nitrogen atmosphere at a magnification of 40X. The polymer component (b) according to the present invention expresses optical anisotropy, since polarized light is transmitted within the molten polymer even when static and is tested between crossed polarizers.

The liquid crystal polymers suitable for use according to the present invention tend to be substantially insoluble in common solvents, and thus are unsuitable for solution processing. However, as described above, these polymers can be easily processed by the well-known melt processing method.

The preferred liquid crystal polymers for use in accordance with the present invention are the aromatic polyesters, including the aromatic polyesteramides, which contain at least one aromatic ring in the polymer chain. Other non-aromatic units optionally may be included in the polymer chains.

The particularly preferred liquid crystal aromatic polyesters and liquid crystal aromatic polyesteramides are derived from at least one compound selected from the group consisting of aromatic hydroxyl carboxylic acids, aromatic hydroxyl amines, and aromatic diamines.

More specifically, there may be mentioned:

(1) polyesters that contain a major concentration of units derived from one, two or more aromatic hydroxycarboxylic acids, and derivatives thereof, (2) polyesters consisting essentially of units derived from:
   (a) one, two or more aromatic hydroxycarboxylic acids, and derivatives thereof,
   (b) one, two or more aromatic dicarboxylic acids, alicyclic dicarboxylic acids, and derivatives thereof, and
   (c) at least one, two or more aromatic diols, alicyclic diols, aliphatic diols, and derivatives thereof, (3) polyesteramides consisting essentially of units derived from:
   (a) one, two or more aromatic hydroxycarboxylic acids, and derivatives thereof,
   (b) one, two or more aromatic hydroxyamines, aromatic diamines, and derivatives thereof, and
   (c) one, two or more aromatic dicarboxylic acids, alicyclic dicarboxylic acids, and derivatives thereof, (4) polyesteramides consisting essentially of units derived from:
   (a) one, two or more aromatic hydroxycarboxylic acids, and derivatives thereof,
   (b) one, two or more aromatic hydroxyamines, aromatic diamines, and derivatives thereof, and
   (c) one, two or more aromatic dicarboxylic acids, alicyclic dicarboxylic acids, and derivatives thereof, and
   (d) at least one, two or more aromatic diols, alicyclic diols, aliphatic diols, and derivatives thereof.

Furthermore, a molecular weight modifier may be used if required together with the above-mentioned components.

Preferred examples of monomers that can be utilized during the production of the liquid crystal polyesters selected for use according to the present invention are naphthalene compounds, such as 2,6-naphthalene dicarboxylic acid, 2,6-dihydroxynaphthalene, 1,4-dihydroxynaphthalene, and 6-hydroxy-2-naphthoic acid; biphenyl compounds, such as 4,4'-diphenyl dicarboxylic acid and 4,4'-dihydroxybiphenyl; benzene compounds substituted at the para-position and nuclear-substituted benzene compounds such as p-hydroxy benzoic acid, terephthalic acid, hydroquinone, p-aminophenol and p-phenylene diamine (wherein substituents such as chlorine, bromine, methyl, ethyl and phenyl are optionally present on the aromatic rings); as well as benzene compounds substituted at the meta-position such as isophthalic acid, resorcinol, Preferred liquid crystal polyesters are formed from naphthalene compounds, such as 2,6-naphthalene dicarboxylic acid, 2,6-dihydroxynaphthalene, 1,4-dihydroxynaphthalene, and 6-hydroxy-2-naphthoic acid; biphenyl compounds such as 4,4'-diphenyl dicarboxylic acid and 4,4'-dihydroxybiphenyl; and compounds expressed by the following general Formulae (I), (II) or (III):

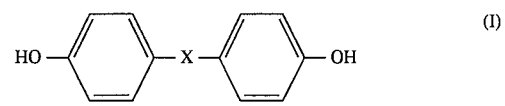

(I)

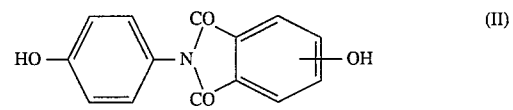

(II)

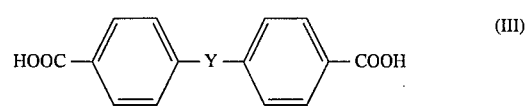

(III)

wherein, X is a radical selected from alkylene ($C_1$ to $C_4$), allcylidene, —O—, —SO—, —$SO_2$—, —S— and —CO—, Y is a radical selected from —$(CH_2)_n$— where n is 1 to 4, and —$O(CH_2)_nO$— where n is 1 to 4.

Furthermore, the liquid crystal polyesters used according to the present invention may include units derived from polyalkylene terephthalates wherein at least some recurring units are included in the molecular chains that do not contribute to the formation of an anisotropic melt phase. In such instances, the alkyl groups may contain from 2 to 4 carbon atoms.

Among the above-mentioned components, those containing one, two or more of compounds selected from naphthalene compounds, biphenyl compounds and benzene compounds linked at the para-positions are particularly preferred. Additionally, among the benzene compounds linked at the p-position, p-hydroxy benzoic acid, methyl hydroquinone, and 1-phenyl ethyl hydroquinone are particularly preferred.

Specific examples of polyesters forming an anisotropic melt phase that are preferred for use in accordance with the present invention are described in Japanese Published Application No. Sho 63-36633.

The above-mentioned polyesters (i.e., aromatic polyesters and polyesteramides) generally exhibit a logarithmic viscosity (I.V.) of at least approximately 2.0 dl/g (e.g., approximately 2.0 to 10.0 dl/g), when dissolved at 60° C. in pentafluorophenol in a concentration of 0.1 percent by weight.

The amount of LCP (b) in the blended composition according to the present invention is 1 to 50 parts by weight per 100 parts by weight of the blend consisting of components (a) and (b), and preferably 10 to 50 parts by weight per 100 parts by weight of the blend consisting of components (a) and (b).

The polyester resins (a) that do not form an anisotropic melt phase used as the other component of the resin composition according to the present invention are thermoplastic macromolecular compounds having ester bonds in main molecular chains. These include polycarbonate resins, polyalkylene terephthalate resins, polyarylate resins, etc.

Such polycarbonate resins of component (a) commonly exhibit repeating units expressed by the following Formula (IV):

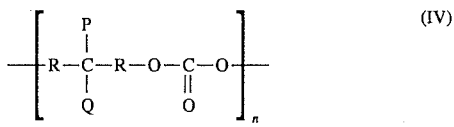

wherein, R is selected from aromatic radicals, such as naphthylene, phenylene, halogen-substituted phenylene and alkyl-substituted phenylene, P and Q are selected respectively from the group consisting of hydrogen, aliphatic hydrocarbon radicals that lack unsaturation, and radicals that form a cycloalkane radical together with adjacent carbon atoms, provided the total number of carbon atoms in P and Q is 12 or less.

The polyalkylene terephthalate resins of component (a) are polyesters obtained by polycondensing terephthalic acid or its esterifying derivatives and an alkylene glycol having 2 to 4 carbon atoms or its esterifying derivatives. Polyethylene terephthalate resins and polybutylene terephthalate resins are examples. Furthermore, there may be used copolymers wherein dicarboxylic acids and alkyl-, alkoxy-, or halogen-substituted compounds thereof, such as isophthalic acid, cyclohexane dicarboxylic acid, adipic acid, dodecane diacid; dihydroxy compounds, such as ethylene glycol, butane diol, triethylene glycol, and diethoxylated bisphenol A; as well as hydroxy carboxylic acids and alkyl-, alkoxy- or halogen-substituted compounds thereof, such as hydroxy benzoic acid and hydroxy naphthoic acid, are introduced as a third component in an amount of approximately 1 to 40 mole percent.

The polyarylate resins of component (a) are aromatic polyester copolymers obtained from terephthalic acid, isophthalic acid or their esterifying derivatives and bisphenols expressed by the general Formula (V):

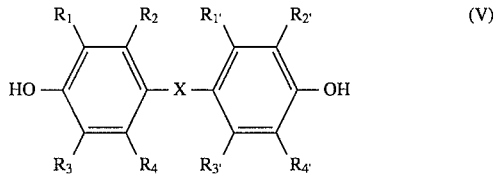

wherein, —X— is selected from a group consisting of —O—, —S—, —SO$_2$—, —CO—, an alkylene radical or an alkylidene radical. If present, the alkylene or alkylidene radicals may be substituted by one or more of hydrocarbon radicals, halogen atoms, or halogenated hydrocarbon radicals. $R_1$, $R_2$, $R_3$, $R_4$, $R_1'$, $R_2'$, $R_3'$ and $R_4'$ are selected from a group consisting of hydrogen atoms, halogen atoms, and hydrocarbon radicals.

The preferred polyester resins (a) which do not form an anisotropic melt phase are the polycarbonate resins and the polyarylate resins when one considers their thermal resistance which makes them particularly attractive to blend with the LCP of component (b) in the molten state.

Furthermore, additional thermoplastic resins that do not form an anisotropic melt phase optionally may be blended with components (a) and (b) in an amount of 1 to 90 parts by weight. Examples of such additional thermoplastic resins include polyethylene, polypropylene, ethylenepropylene copolymers, ethylene-vinyl acetate copolymers, polyamides, polyacetal; styrene resins such as polystyrene, styrene-butadiene copolymers, styrene-butadiene-acrylonitrile copolymers (or their ester copolymers), styrene thermoplastic elastomers comprising a hydrogenated block copolymer of styrene and isoprene (such as products marketed under the trademarks SEP or SEPS), and styrene-acrylonitrile copolymers; polyurethane, fluorine resins, polyphenylene oxide, polyphenylene sulfide, polybutadiene, butyl rubbers, silicone resins, olefin thermoplastic elastomers (such as EPDM or ionomer); urethane thermoplastic elastomers, polyester thermoplastic elastomers, polyamide thermoplastic elastomers, polyether thermoplastic elastomers, and multilayer graft copolymers comprising predominantly polyacrylate or their modified copolymers. The particularly preferred additional thermoplastic resins are styrene resins and the polyphenylene oxide resins since these tend to exhibit a high degree of compatibility with the polyester resins.

In order to fibrillate LCP of component (b) during the molding step to an average aspect ratio of 6 or more in accordance with the concept of the present invention, it is necessary to add the phosphorus compound (c). Representative examples of such phosphorus compounds include phosphate compounds and phosphite compounds, such as tetrakis(2,4-di-t-butylphenyl)-4,4'-biphenylene phosphonite, bis(2,6-di-t-butyl-4-methylphenyl)pentaerythritol diphosphite, his(2,4,6-di-t-butylphenyl)pentaerythritol diphosphite, and tris(2,4-di-t-butylphenyl)phosphite. Phosphite compounds are preferred, and phosphite compounds of the pentaerythritol type are particularly preferred.

In accordance with the concept of the present invention the LCP of component (b) is readily fibrillated during molding even under low shear molding conditions through the presence of the phosphorus compound. Such fibrillation is achieved not only in thin molded articles but within thick molded articles where it occurs not only at the surface but also throughout the interior. Accordingly, the resulting molded articles exhibit a high strength and a high modulus of elasticity in view of the presence of such fibrils.

The phosphorus compound preferably is blended with components (a) and (b) in concentration of approximately 0.01 to 0.5 part by weight and most preferably in a concentration of approximately 0.05 to 0.3 part by weight per 100 parts by weight of components (a) and (b). If the blended amount of the phosphorus compound is less than approximately 0.01 part by weight, the LCP of component (b) cannot be fibrillated to the average aspect ratio of 6 or more during conventional molding wherein components (a) and (b) are in the molten state. If the phosphorus compound is blended in more than approximately 0.5 part by weight, then significant gassing of the blended phosphorus compound can be produced so as to damage the mechanical strength and moldability of the resulting molded article. It is preferred that the ratio of the phosphorus compound (c) to the polyester component (a) that does not form an anisotropic melt phase is approximately 0.001 to 0.005:1. If the quantity of the phosphorus compound is within this range, the LCP is readily fibrillated during molding regardless of the molding conditions and the configuration of the product.

Various fibrous, powdery or plate-like inorganic fillers optionally may be blended into the molded product formed from the synthetic resin composition of the present invention.

Representative fibrous fillers include glass fibers, asbestos fibers, silica fibers, silica-alumina fibers, alumina fibers, zirconia fibers, boron nitride fibers, silicon nitride fibers, boron fibers and potassium titanate fibers, as well as metal fibrous materials, such as stainless steel, aluminum, titanium, copper, and brass.

Representative powdery fillers include carbon black, graphite, silica, quartz powders, glass beads, milled glass fibers, glass balloons (i.e., small glass spheres), glass powders; silicates such as potassium silicate, aluminum silicate, kaolin, talc, clay, diatomaceous earth and wollastonite; metal oxides such as iron oxide, titanium oxide, zinc oxide, antimony trioxide and alumina; metal carbonates such as potassium carbonate and magnesium carbonate; metal sulfates such as potassium sulfate and barium sulfate; as well as ferrite, silicon carbide, silicon nitride, boron nitride and various metal powders.

Representative plate-like fillers include mica, glass flakes, and various metal foils.

The inorganic fillers may be used alone or in mixtures of two or more of such fillers.

The inorganic fillers used according to the present invention optionally may be surface treated in order to modify their surface characteristics. For example, surface-treating compounds, such as epoxy compounds, isocyanate compounds, timate compounds, polyamide compounds, and silane compounds can be utilized. The fillers may be surface-treated prior to blending with the other components, or the surface-treating compounds can be added at the time of the blending of the components that form the improved synthetic resin composition of the present invention.

The inorganic filler when utilized preferably is provided in a concentration of approximately 1 to 50 percent by weight based upon the total weight of the resinous components.

Furthermore, a flame retardant can be blended to retard burning. Organic halogenated compounds etc. may be used as the flame retardant, with the aromatic bromine compounds being particularly preferred. As an auxiliary flame retardant, there may be used metal oxides and hydroxides, such as antimony trioxide, antimony halide, aluminum hydroxide, and magnesium hydroxide.

As previously indicated, the LCP component is preferably fibrillated during molding to an average aspect ratio of 6 or more and is present as such within the molded product. If the average aspect ratio is much less than approximately 6, the advantageous characteristics of the resin composition when molded, such as high strength and high modulus of elasticity, cannot be obtained. This is particularly noticeable in a thin molded product where weight reduction and/or miniaturization is being sought. In such instances, sufficient rigidity commonly cannot be obtained.

The synthetic composition according to the present invention can be prepared by conventional melt blending using standard equipment. For example, the components can be mixed and extruded with kneading by use of a one- or two-screw extruder to prepare pellets, and then the pellets are supplied to a conventional molding machine where they are melt processed. The LCP component becomes fibrillated during the molding step. For instance, the LCP component while present within the PC component together with the phosphorus compound is molded at a temperature above the melting temperatures at which the resinous components are melted and will flow when a shear force is applied. At this temperature the LCP is easily fibrillated by the application of a shear force thereby causing fibrillation and making good use of the characteristics of the rigid LCP molecules in the resulting molded article.

The invention is illustrated by the following working Examples; however, the invention is not limited to the specific details set forth in the Examples.

EXAMPLE 1

0.1 part by weight of the phosphite ester [bis(2,6-di-t-butyl-4-methylphenyl)pentaerythritol diphosphite] was blended with a resin component prepared in a mixing ratio of 9:1 by weight comprising a polycarbonate component (PC) commercially available from Mitsubishi Gas Kagaku Co. Ltd. under the Upiron S 3000 designation and LCP-A (defined hereafter) to obtain a blend, which was heated until molten and was kneaded at a temperature of 50° C. in a twin-screw 30 mm. extruder in order to pelletize the same. The resulting pellets were molded to a test piece at a resin temperature of 250° C. by injection molding and the piece was evaluated for mechanical properties, melt viscosity, and the average aspect ratio of the fibrillated LCP present therein. The results are shown in Table 1.

The evaluation methods were performed as follows.

Modulus of Bending Elasticity

According to ASTM D790, the modulus of bending elasticity (kg/cm$^2$) was determined while using a test piece having a thickness of 1/16 inch.

Izod Impact Strength

According to ASTM D256, the Izod impact strength was determined with notching (kgfcm/cm).

Average Aspect Ratio of LCP (length/thickness)

The test piece used in the determination of modulus of bending elasticity was cut in a manner to obtain a parallel plane in the flow direction, a section thereof was polished by mirror cotton, and the surface thereof was observed and evaluated by use of an electron microscope. That is, fifty representative fibrils of the fibrillated LCP were selected randomly and the length/thickness was determined for each and was used to obtain an average value. The fiber length observable on the cut surface was considered to be the length. Evaluation standards for the results reported hereafter are as follows:

Average aspect ratio of 6 or more: O.

Average aspect ratio of less than 6: X.

Melt Viscosity

It was determined by means of a melt viscosity meter manufactured by Toyo Seiki Co. Ltd. The determination was made at the molding temperature while using a shear rate of 1,000 sec$^{-1}$.

EXAMPLES 2 AND 3

A test piece was molded and evaluated as described in Example 1 with the exception that the extrusion temperature and the molding temperature were varied. The results are shown in Table 1.

EXAMPLES 4 AND 5

A test piece was molded and evaluated as described in Example 3 with the exception that the mixing ratio of PC and LCP-A as well as the blended amount of the phosphite ester were varied. The results are shown in Table 1.

COMPARATIVE EXAMPLE 1

A test piece was molded and evaluated as described in Example 3 with exception that the phosphite ester was omitted. The results are shown in Table 1.

COMPARATIVE EXAMPLES 2 and 3

A test piece was molded and evaluated as described in Comparative Example 1 with the exception that the mixing ratios of PC and LCP-A were varied. The results are shown in Table 1.

COMPARATIVE EXAMPLES 4 and 5

A test piece was molded and evaluated as described in Comparative Example 1 with the exception that solely PC pellets or solely LCP-A pellets were utilized. The results are shown in Table 1.

EXAMPLES 6, 7 and 8

A test piece was molded and evaluated as described in Example 5 with the exception that a polyarylate (PAR) manufactured by Unichika Co. Ltd., under the designation of U polymer: U-1000; or polybutylene terephthalate (PBT) manufactured by Polyplastics Co. Ltd., under the designation Duranex: #2002; or polyethylene terephthalate (PET) manufactured by Kanegafuchi Kagaku Kogyo Co. Ltd., under the designation Belpet: DFG-1, were used instead of the PC. The results are shown in Table 2.

EXAMPLES 9, 10 AND 11

A test piece was molded and evaluated as described in Example 5 with the exception that mixtures of PC and PAR, PC and PBT, and PBT and PET (mixing ratio=5:2) were used instead of PC. The results are shown in Table 2.

EXAMPLES 12, 13, 14, AND 15

A test piece was molded and evaluated as described in Example 5 with the exception that mixtures of PC and ABS manufactured by Daiseru Kagaku Co. Ltd., under the designation Sebian-V: #680; PAR and ABS, PBT and PPE manufactured by GEPJ Co. Ltd., under the designation Noryl: 731J (mixing ratio=5:2) were used instead of PC. The results are shown in Table 2.

COMPARATIVE EXAMPLES 6 AND 7

A test piece was molded and evaluated as described in Examples 6 or 7 except that the phosphite ester was omitted. The results are shown in Table 3.

COMPARATIVE EXAMPLES 8, 9 AND 10

A test piece was molded and evaluated as described in Examples 9 to 11 except that the phosphite ester was omitted. The results are shown in Table 3.

COMPARATIVE EXAMPLES 11, 12 AND 13

A test piece was molded and evaluated as described in Examples 12 to 14 with the exception that the phosphite ester was omitted. The results are shown in Table 3.

EXAMPLES 16, 17, 18 AND 19

PC, LCP-A, a phosphite ester and an inorganic filler were blended in the proportions as shown in Table 4, and test pieces were molded and evaluated as described in the foregoing Examples. The results are shown in Table 4.

EXAMPLES 20 AND 21

PC, LCP-B, a phosphite ester, and an inorganic filler were blended in the proportions shown in Table 4, and test pieces were molded and evaluated as described in the foregoing Examples. The results are shown in Table 4.

COMPARATIVE EXAMPLES 14, 15 and 16

PC, LCP-A, and an inorganic filler were blended at the proportions shown in Table 4 in the absence of a phosphite ester, and test pieces were molded and evaluated as described in the foregoing Examples. The results are shown in Table 4.

Herein, the liquid polyester resin used in Examples were those having the following recurring units:

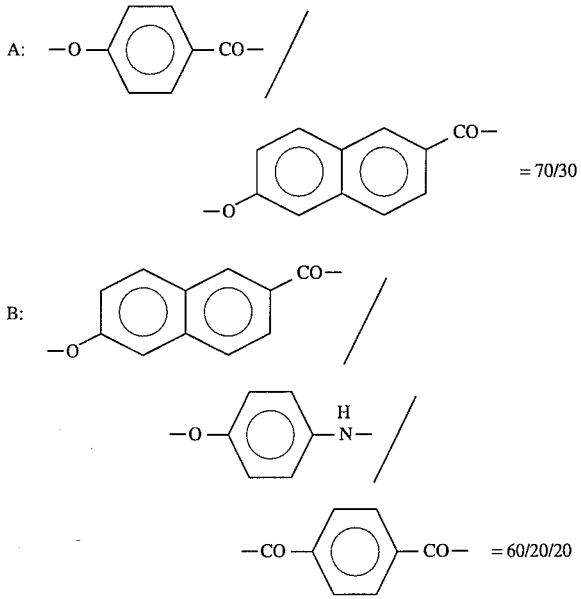

wherein molar ratios for the recurring units are as stated.

Although the invention has been described with preferred embodiments, it is to be understood that variations and modifications may be employed without departing from the concept of the invention as defined in the claims.

TABLE 1

|  | Example 1 | Example 2 | Example 3 | Example 4 | Example 5 | Comparative Example 1 | Comparative Example 2 | Comparative Example 3 | Comparative Example 4 | Comparative Example 5 |
| --- | --- | --- | --- | --- | --- | --- | --- | --- | --- | --- |
| resin component |  |  |  |  |  |  |  |  |  |  |
| PC (part by weight) | 90 | 90 | 90 | 80 | 70 | 90 | 80 | 70 | 100 | — |
| LCP-A (part by weight) | 10 | 10 | 10 | 20 | 30 | 10 | 20 | 30 | — | 100 |
| phosphite A (part by weight) | 0.1 | 0.1 | 0.1 | 0.2 | 0.3 | — | — | — | — | — |
| melting point of LCP (°C.) | 280 | 280 | 280 | 280 | 280 | 280 | 280 | 280 | — | 280 |
| extrusion temperature (°C.) | 250 | 250 | 300 | 300 | 300 | 300 | 300 | 300 | — | — |
| molding temperature (°C.) | 250 | 300 | 300 | 300 | 300 | 300 | 300 | 300 | 250 | 300 |
| injection speed (mm/s) | 58.3 | 58.3 | 58.3 | 58.3 | 58.3 | 58.3 | 58.3 | 58.3 | 20.8 | 20.8 |
| average aspect ratio of LCP (as previously defined) | o | o | o | o | o | x | x | x | x | x |
| modulus of elasticity in bending (kg/cm$^2$)1/32" | 26000 | 40000 | 39000 | 51000 | 66000 | 30000 | 32000 | 31000 | 25000 | 150000 |
| Izod W/N(kg-cm/cm) | 20.2 | 35.3 | 32.5 | 12.5 | 8.8 | 2.6 | 1.9 | 1.8 | 12.6 | 44.2 |
| melt viscosity (poise) at molding temperature | 8649 | 1856 | 1725 | 1341 | 1089 | 2498 | 3093 | 4016 | 9574 | 609 |

TABLE 2

|  | Example 6 | Example 7 | Example 8 | Example 9 | Example 10 | Example 11 | Example 12 | Example 13 | Example 14 | Example 15 |
| --- | --- | --- | --- | --- | --- | --- | --- | --- | --- | --- |
| resin component |  |  |  |  |  |  |  |  |  |  |
| PC (part by weight) | — | — | — | 50 | 50 | — | 50 | — | — | — |
| PAR (part by weight) | 70 | — | — | 20 | — | — | — | 50 | — | — |
| PBT (part by weight) | — | 70 | — | — | 20 | 50 | — | — | 50 | 50 |
| PET (part by weight) | — | — | 70 | — | — | 20 | — | — | — | — |
| ABS (part by weight) | — | — | — | — | — | — | 20 | 20 | 20 | — |
| PPE (part by weight) | — | — | — | — | — | — | — | — | — | 20 |
| LCP-A (part by weight) | 30 | 30 | 30 | 30 | 30 | 30 | 30 | 30 | 30 | 30 |
| phosphite A (part by weight) | 0.3 | 0.3 | 0.3 | 0.3 | 0.3 | 0.3 | 0.3 | 0.3 | 0.3 | 0.3 |
| melting point of LCP (°C.) | 280 | 280 | 280 | 280 | 280 | 280 | 280 | 280 | 280 | 280 |
| extrusion temperature (°C.) | 300 | 300 | 300 | 300 | 300 | 300 | 300 | 300 | 300 | 300 |
| molding temperature (°C.) | 300 | 300 | 300 | 300 | 300 | 300 | 300 | 300 | 300 | 300 |
| injection speed(mm/s) | 58.3 | 58.3 | 58.3 | 58.3 | 58.3 | 58.3 | 58.3 | 58.3 | 58.3 | 58.3 |
| average aspect ratio of LCP (as previously defined) | o | o | o | o | o | o | o | o | o | o |
| modulus of elasticity in bending (kg/cm$^2$)1/32" | 57000 | 63000 | 60000 | 56000 | 67000 | 64000 | 53000 | 61000 | 52000 | 56000 |
| Izod W/N(kg-cm/cm) | 30.3 | 27.5 | 22.3 | 27.8 | 11.5 | 16.1 | 35.2 | 22.4 | 18.0 | 20.5 |
| melt viscosity (poise) at molding temperature | 2297 | 1865 | 1765 | 2318 | 1754 | 1903 | 2231 | 2336 | 2400 | 1957 |

TABLE 3

|  | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|
| resin component |  |  |  |  |  |  |  |  |
| PC (part by weight) | — | — | 50 | 50 | — | 50 | — | — |
| PAR (part by weight) | 70 | — | 20 | — | — | — | 50 | — |
| PBT (part by weight) | — | 70 | — | 20 | 50 | — | — | 50 |
| PET (part by weight) | — | — | — | — | 20 | — | — | — |
| ABS (part by weight) | — | — | — | — | — | 20 | 20 | 20 |
| PPE (part by weight) | — | — | — | — | — | — | — | — |
| LCP-A (part by weight) | 30 | 30 | 30 | 30 | 30 | 30 | 30 | 30 |
| phosphite A (part by weight) | — | — | — | — | — | — | — | — |
| melting point of LCP (°C.) | 280 | 280 | 280 | 280 | 280 | 280 | 280 | 280 |
| extrusion temperature (°C.) | 300 | 300 | 300 | 300 | 300 | 300 | 300 | 300 |
| molding temperature (°C.) | 300 | 300 | 300 | 300 | 300 | 300 | 300 | 300 |
| injection speed (mm/s) | 58.3 | 58.3 | 58.3 | 58.3 | 58.3 | 58.3 | 58.3 | 58.3 |
| average aspect ratio of LCP (as previously defined) | x | x | x | x | x | x | x | x |
| modulus of elasticity in bending (kg/cm$^2$)1/32" | 27000 | 27700 | 30000 | 32000 | 37000 | 29000 | 23000 | 24300 |
| Izod W/N (kg-cm/cm) | 3.5 | 1.5 | 2.3 | 5.2 | 1.6 | 6.1 | 5.2 | 1.5 |
| melt viscosity (poise) at molding temperature | 5427 | 2765 | 5765 | 2574 | 3054 | 4073 | 5431 | 4632 |

TABLE 4

|  | Example 16 | Example 17 | Example 18 | Example 19 | Example 20 | Example 21 | Comparative Example 14 | Comparative Example 15 | Comparative Example 16 |
|---|---|---|---|---|---|---|---|---|---|
| resin component |  |  |  |  |  |  |  |  |  |
| PC (part by weight) | 90 | 80 | 70 | 70 | 90 | 70 | 90 | 80 | 70 |
| LCP-A (part by weight) | 10 | 20 | 30 | 30 | — | — | 10 | 20 | 30 |
| LCP-B (part by weight) | — | — | — | — | 10 | 30 | — | — | — |
| phosphite A (part by weight) | 0.1 | 0.2 | 0.3 | 0.3 | 0.1 | 0.3 | — | — | — |
| carbon fiber (part by weight) | 12 | 12 | 5 | 6 | 12 | 5 | 12 | 12 | 5 |
| glass flake (part by weight) | — | — | — | 6 | — | — | — | — | — |
| melting point of LCP (°C.) | 280 | 280 | 280 | 280 | 280 | 280 | 280 | 280 | 280 |
| extrusion temperature (°C.) | 300 | 300 | 300 | 300 | 300 | 300 | 300 | 300 | 300 |
| molding temperature (°C.) | 300 | 300 | 300 | 300 | 300 | 300 | 300 | 300 | 300 |
| injection speed (mm/s) | 58.3 | 58.3 | 58.3 | 58.3 | 58.3 | 58.3 | 58.3 | 58.3 | 58.3 |
| average aspect ratio of LCP (as previously defined) | o | o | o | o | o | o | x | x | x |
| modulus of elasticity in bending (kg/cm$^2$)1/32" | 82000 | 106000 | 79000 | 90000 | 86000 | 98000 | 63000 | 67000 | 50000 |
| Izod W/N(kg-cm/cm) | 8.9 | 9.5 | 6.7 | 8.9 | 9.1 | 9.3 | 5.1 | 4.5 | 2.4 |
| melt viscosity (poise) at molding temperature | 2264 | 1276 | 852 | 1141 | 2177 | 1523 | 2337 | 2511 | 3297 |

We claim:

1. An improved synthetic resin composition consisting essentially of 100 parts by weight of a resin component composed of 50 to 99 parts by weight of a melt-processable thermoplastic polyester resin (a) that does not form an anisotropic melt phase, and 1 to 50 parts by weight of a liquid crystal polyester resin (b) that is capable of forming an anisotropic melt phase, as well as 0.01 to 0.5 part by weight of a phosphite compound of pentaerythritol (c), with said liquid crystal polyester resin (b) being capable of forming fibrils having an aspect ratio of 6 or more during the molding of said resin composition.

2. An improved synthetic resin composition according to claim 1, wherein said phosphorus compound (c) is present in a concentration of approximately 0.05 to 0.3 part by weight.

3. An improved synthetic resin composition according to claim 1, wherein the weight ratio (c) to (a) is approximately 0.001 to 0.005:1.

4. An improved synthetic resin composition according to claim 1, wherein said melt-processable thermoplastic polyester resin (a) is selected from the group consisting of a polycarbonate resin, a polyalkylene terephthalate resin, and a polyarylate resin.

5. An improved synthetic resin composition according to claim 1, wherein said melt-processable thermoplastic polyester resin (a) is a polycarbonate resin.

6. An improved synthetic resin composition according to claim 2, wherein said melt-processable thermoplastic polyester resin (a) is a polycarbonate resin.

7. An improved synthetic resin composition according to claim 3, wherein said melt-processable thermoplastic polyester resin (a) is a polycarbonate resin.

8. An improved synthetic resin composition according to claim 1, wherein said melt-processable thermoplastic polyester resin (a) is polyethylene terephthalate and/or polybutylene terephthalate.

9. An improved synthetic resin composition according to claim 2, wherein said melt-processable thermoplastic polyester resin (a) is a polyethylene terephthalate and/or a polybutylene terephthalate.

10. An improved synthetic resin composition according to claim 3, wherein said melt-processable thermoplastic polyester resin (a) is a polyethylene terephthalate and/or a polybutylene terephthalate.

11. An improved synthetic resin composition according to claim 1, further consisting essentially of approximately 1 to 90 parts by weight of a thermoplastic resin not forming an anisotropic melt phase in addition to (a) and (b).

12. An improved synthetic resin composition according to claim 1, further consisting essentially of approximately 1 to 50 parts by weight of an inorganic filler.

13. An improved resin composition according to claim 1, wherein (a) is present in a concentration of approximately 50 to 90 parts by weight, (b) is present in a concentration of approximately 10 to 50 parts by weight, and (c) is present in a concentration of approximately 0.05 to 0.3 part by weight.

14. A molded article formed by the molding of the improved synthetic resin composition according to claim 1, wherein (b) is present therein in the form of fibrils having an aspect ratio of 6 or more.

15. A molded article formed by the molding of the improved synthetic resin composition according to claim 1 while at a temperature above the melting temperatures of (a) and (b) and wherein (b) is present therein in the form of fibrils having an aspect ratio of 6 or more.

* * * * *